Patented Sept. 26, 1950

2,524,023

UNITED STATES PATENT OFFICE 2,524,023

VINYLIDENE CHLORIDE - BUTADIENE - METHYL METHACRYLATE INTERPOLYMERS

George William Stanton and Charles Everett Lowry, Midland, Mich., assignors to The Dow Chemical Company, Midland, Mich., a corporation of Delaware No Drawing. Application May 16, 1946, Serial No. 670,286

1 Claim. (Cl. 260—80.7)

This invention relates to vulcanizable interpolymers suitable for use as calendered coatings for flexible base materials and for use in the manufacture of extruded electrical insulation and molded mechanical rubber goods. It relates in particular to certain interpolymers of vinylidene chloride, butadiene-1,3 or isoprene, and methyl methacrylate.

Some of the binary copolymers of vinylidene chloride and methyl methacrylate are disclosed and claimed by Wiley in U. S. Patent No. 2,160,-945. The binary copolymers of vinylidene chloride and butadiene-1,3 are disclosed and claimed in U. S. Patents Nos. 2,215,379, 2,376,208 and 2,380,356, issued to the assignees of Sebrell, Tucker and Youker, respectively.

The vinylidene chloride-methyl methacrylate binary copolymers are thermoplastics which are neither rubbery nor vulcanizable. They are rigid and relatively insoluble materials at high vinylidene chloride concentrations and become somewhat more soluble as the amount of copolymerized methyl methacrylate increases. Similarly the binary copolymers of vinylidene chloride and butadiene-1,3 as well as the corresponding copolymers of vinylidene chloride and isoprene vary from rigid thermoplastic and highly insoluble materials at vinylidene chloride concentrations above 90 per cent through strong rubbers having from 20 to 50 per cent and more of butadiene or of isoprene. At least when some of the commoner polymerization methods are employed, the binary copolymers of vinylidene chloride and either butadiene-1,3 or isoprene containing roughly from 60 to 90 per cent of the diene hydrocarbon are factice-like solids of rather low strength which are capable of but little elongation. Though the binary copolymers of vinylidene chloride and butadiene and of butadiene and methyl methacrylate are vulcanizable materials, they are deficient as regards many required coating properties and their compositions are not ideal for use in the manufacture of extruded electrical insulation or of molded rubber articles for many purposes.

It is an object of the present invention to provide a vulcanizable synthetic rubber-like material which is adapted to form abrasion resistant and moisture impervious coatings, preferably by the relatively simple process of calendering the material on the desired base. Another object is to provide such a composition suitable for employment in the manufacture of extruded electrical insulation for wire. A further object is to provide a vulcanizable synthetic rubber-like material which is resistant to abrasion and to the action of many common chemicals and organic solvents and which is adapted for use in the manufacture of molded and otherwise fabricated mechanical rubber goods.

In the following description and claims the term "butadiene" is understood to signify the compound butadiene-1,3. The term "isoprene" refers to the compound 2-methyl butadiene-1,3. The term "interpolymer" is used herein to mean the product obtained by the polymerization of a mixture of three or more monomers. To distinguish therefrom, the term "copolymer" is arbitrarily used herein to designate a product similarly derived from a mixture of two monomers.

It has now been found that the foregoing and related objects may be attained through the provision of the ternary interpolymers produced from a monomeric mixture of from 40 to 70 per cent vinylidene chloride, 15 to 30 per cent of the diene hydrocarbon and from 8 to 35 per cent of methyl methacrylate. In its preferred modification the invention comprises the provision of an interpolymer of from 48 to 67 per cent vinylidene chloride, from 25 to 33 per cent of butadiene and from 8 to 23 per cent of methyl methacrylate.

The ternary interpolymers of the present invention are most conveniently made by the emulsion polymerization process, preferably employing a mildly alkaline aqueous medium as the continuous phase of the emulsion. The new interpolymers have also been made in emulsion using the acidic conditions and catalyst described by Britton and LeFevre in U. S. Patent No. 2,333,633. They have also been made in aqueous suspension, without emulsifying agents, using benzoyl peroxide as the catalyst. For the present purposes of comparison between the various compositions in the interpolymer system under consideration, a standard polymerization procedure was adopted eliminating as far as possible any variations due to changes in relative concentrations of the disperse and continuous phases, catalysts, temperatures, emulsifiers, alkalies and the like. The standard procedure for small scale preparations as as follows:

A stock solution is prepared consisting of 98.5 per cent by weight of pure water, one per cent of a purified grade of sodium lauryl sulfate and 0.5 per cent of sodium carbonate. To 75 parts by weight of the aqueous stock solution is added 25 parts by weight of the chosen monomers in the proportions being investigated, and 0.125 parts of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an antioxidant, such as polymerized trimethyl dehydroquinoline. The latex is then coagulated after dilution with water, by addition of a 50 per cent aqueous methanol solution containing 0.4 per cent of magnesium chloride. The coagulum is washed with water and vacuum dried at 70° C. overnight. When making batches involving more than about a gallon of reaction medium the amount of monomer is increased to about 33.3 per cent of the weight of the emulsion and the stock solution is correspondingly fortified to contain about 1.5 per cent of the emulsifying agent and 0.75 per cent of sodium carbonate. The catalyst concentration is increased correspondingly to about .165 per cent.

The new interpolymers may be used either in their natural state, or after being compounded, for the purpose of applying coatings to flexible base materials or for the preparation of moldings, sheet or film. A wide variety of formulations may be employed to yield satisfactorily compounded materials from the new interpolymers. For the purposes of the present description, and in order to obtain representative and comparable values in those tests carried out on compounded and vulcanized batches of the present ternary interpolymers, a standard procedure was developed and a standard formulation was employed. That formulation contained the following ingredients in the designated parts by weight:

| Ingredient | Parts |
|---|---|
| Interpolymer | 100 |
| Stearic acid | 1 |
| Butyl phthalyl butyl glycolate (plasticizer) | 10 |
| Litharge | 5 |
| Benzothiazyl disulfide (accelerator) | 1 |
| Sulfur | 2 |
| Carbon Black | 35–40 |

(The preferred carbon blacks were selected from the class of "easy processing" channel blacks and "semi-reinforcing" furnace blacks.)

In preparing the test formulations, the interpolymers are first broken down on a cold mill, the addition agents are milled into the interpolymer in the order named, and the mixture is sheeted from the mill. It may be sheeted directly to a calender stack where the compounded sheet is brought into contact with a sheet of paper, cloth, or other flexible base material which it is desired to coat, and the assembly is passed through the stack to effect a reduction in thickness of the coating and to insure the provision of a uniform and continuous coating on the flexible base. The compounded sheet may also be fed from the mill through the calender stack without a supporting base material, thus providing a thin sheet or film of the compounded interpolymer. It is generally found desirable to cure the calendered films or coated or molded articles, before they are adapted to use in commerce. Such cure can be effected at about 138° C. with or without the application of superatmospheric pressure (suitably up to 400 pounds per square inch) for periods up to about 75 minutes.

The new interpolymers containing methyl methacrylate in amounts from 8 to 35 per cent have considerably less internal friction during fabrication than does the binary copolymer of 70 per cent vinylidene chloride and 30 per cent butadiene (hereinafter referred to for purposes of comparison as copolymer A). This reduced internal friction, which makes for greater ease of fabrication in processes involving calendering or extrusion, is evidenced by the Mooney viscosity values of the new interpolymers determined in the manner described in India Rubber World for April 1, 1935, at page 49. The new copolymers which are most readily milled, extruded and molded are those made from a monomeric mixture containing from about 48 to 67 per cent vinylidene chloride, from 25 to 33 per cent butadiene and from 8 to 23 per cent of methyl methacrylate.

The new interpolymers in the range just defined which exhibit the lowest Mooney viscosities also exhibit greater resilience, as measured by the Bashore rebound test, than does copolymer A. In this test copolymer A gives an average value of about 15 per cent whereas the ternary interpolymers of the present invention give values of from 20 to 25 per cent. By way of contrast, a ternary interpolymer of 30 per cent vinylidene chloride, 40 per cent butadiene and 30 per cent methyl methacrylate, which does not fall within the scope of the present invention, has a Bashore rebound value of only 9 per cent.

All of the ternary interpolymers of the present invention have improved electrical properties as compared with those of copolymer A. Thus, the per cent power factor for all the new interpolymers is lower than that of copolymer A and at 1,000,000 cycles it is also lower than the per cent power factor of ternary interpolymers falling outside of the herein claimed range and containing larger amounts of methyl methacrylate. The dielectric constant of the new interpolymers, when measured both at 1,000 and at 1,000,000 cycles per second, is lower than that of either copolymer A or of the ternary interpolymers containing larger amounts of methyl methacrylate.

Portions of the crude interpolymers were given three passes through a rubber mill and molded into sheets approximately 100 mils in thickness. From these unvulcanized sheets, samples were cut for the determination of the standard crescent tear test (A. S. T. M. D624–41T). In this test copolymer A had an average tear resistance of 118 pounds per inch. The interpolymers of the present invention had tear resistance values ranging from 167 to about 225 pounds per inch. This property is desirable when the interpolymers are to be used in the form of wrapping materials both when prepared as calendered films and as films deposited from a latex resulting from the polymerization.

In the compounded and cured condition, molded specimens of the new interpolymers exhibited tensile stress values at 100 per cent elongation considerably greater than those of similarly compounded and cured specimens of copolymer A. Thus, when the new interpolymer employed was one containing 55 per cent vinylidene chloride, 30 per cent butadiene and 15 per cent methyl methacrylate, the tensile stress value at 100 per cent elongation was 1,560 pounds per square inch, in contrast with a value of 785 pounds for copolymer A.

The new interpolymers are not only fully as resistant to the action of most acids, alkalies and other chemicals ordinarily encountered by rubber goods but are also characterized by equally as high resistance to swelling in the presence of organic solvents. They have an extreme resistance to petroleum distillates, including lubricating and other mineral oils. The resistance of the new products to oil and solvents, in comparison with various other synthetic rubber compositions, may be illustrated by means of the following test. Strips of the compounded and cured synthetic rubbers were prepared with dimensions of 1 inch wide by $\frac{3}{16}$ inch thick by 6 inches long. These were folded through an arc of 180° and the ends were clamped .75 inch below the peak of the fold. Each strip was nicked with a razor blade as near as possible to the fold and a drop of solvents was placed in the nick. The resulting crack was kept wet with solvent and a measurement was made of the time required for the specimen to separate into two parts as a result of the action of the solvent.

affected than is the ternary interpolymer of the same ingredients falling outside of the range of the present invention.

Table

| | Rubber | Per Cent Linear Swell After 24 Hours Immersion at Room Temperature | | | | | |
|---|---|---|---|---|---|---|---|
| | | Ethylene Chloride | Cyclohexane | Tetrachloroethane | Dioxane | Benzene | Acetone |
| 1 | Polymerized chlorobutadiene | 104 | 128 | 143 | 100 | 132 | |
| 2 | 75 Butadiene, 25 Acrylonitrile | 125 | 112 | 202 | 83 | 93 | |
| 3 | 55 Vinylidene Chloride, 30 Butadiene, 15 Methyl Methacrylate | 103 | 82 | 132 | 98 | 123 | 26 |
| 4 | 30 Vinylidene Chloride, 40 Butadiene, 30 Methyl Methacrylate | 183 | 136 | 202 | 156 | 154 | 55 |

The preceding examples in which specific compositions have been identified as falling within the present invention have been based on ternary interpolymers containing 30 per cent of butadiene. Tests have shown that comparable results are obtained when the butadiene content varies in the previously defined preferred range of from 25 to 33 per cent and that the interpolymers containing from 15 to 35 per cent butadiene in the broad range of proportions initially disclosed all show advantageous properties in comparison with the corresponding adjacent binary copolymers of butadiene and vinylidene chloride as well as when compared with ternary copolymers of the same ingredients falling outside of the recited range of proportions. Similar advantage may be shown

Table

| | Rubber | Solvent Tear Time | | | | | |
|---|---|---|---|---|---|---|---|
| | | Toluene | | Ethylene Chloride | | Benzene | |
| | | Min. | Sec. | Min. | Sec. | Min. | Sec. |
| 1 | 75 Butadiene, 25 Styrene | | 10 | | 5 | | 10 |
| 2 | 65 Butadiene, 35 Acrylonitrile | 1 | 25 | | 25 | 1 | 50 |
| 3 | 75 Butadiene, 25 Acrylonitrile | 1 | 20 | | 35 | | 50 |
| 4 | 55 Vinylidene Chloride, 30 Butadiene, 15 Methyl Methacrylate | 1 | 19 | 1 | 13 | 1 | 34 |
| 5 | 30 Vinylidene Chloride, 40 Butadiene, 30 Methyl Methacrylate | | 22 | | 15 | | 14 |

It is noted that the representative of the new interpolymers (item No. 4) was at least equal to, and in most instances was superior to the commercial synthetic rubbers tested. It was superior to a ternary interpolymer (item No. 5) of the same ingredients falling outside of the range of the present invention. It should be noted further that the commercial samples of synthetic rubber used in the test were formulated especially for tank lining purposes while the new interpolymers were prepared according to the standard formulation defined earlier in this application.

Other samples of the compounded and cured interpolymers were compared with samples of commercially compounded tank lining stocks employed in the preceding example, by immersing the various samples in solvents until complete swelling was obtained and measuring the extent of swelling. The product of the present invention, while swollen by the same solvents which act upon most commercial synthetic rubbers, is seen in the following table to be much less by the new interpolymers containing isoprene in comparison with the corresponding vinylidene chloride-isoprene copolymers.

We claim:

A ternary interpolymer made by dispersing in water and polymerizing a monomeric mixture of 55 per cent of vinylidene chloride, 30 per cent of butadiene-1,3 and 15 per cent of methyl methacrylate.

GEORGE WILLIAM STANTON.
CHARLES EVERETT LOWRY.

REFERENCES CITED

The following references are of record in the file of this patent:

UNITED STATES PATENTS

| Number | Name | Date |
|---|---|---|
| 2,313,233 | Fryling | Mar. 9, 1943 |
| 2,333,403 | Youker | Nov. 2, 1943 |
| 2,380,356 | Youker | July 10, 1945 |
| 2,380,905 | Stewart | July 31, 1945 |
| 2,394,406 | Schoenfeld | Feb. 5, 1946 |